3,527,812
1,1 - DIFLUORO - 2,2 - DICHLOROETHYL DIFLUOROMETHYL ETHER AND ITS METHOD OF PREPARATION

Ross C. Terrell, Summit, N.J., assignor to Air Reduction Company, Incorporated, New York, N.Y., a corporation of New York
No Drawing. Original application Oct. 3, 1966, Ser. No. 583,948, now Patent No. 3,461,213, dated Aug. 12, 1969. Divided and this application Oct. 9, 1968, Ser. No. 778,904
Int. Cl. C07c 43/00, 43/12
U.S. Cl. 260—614           1 Claim

ABSTRACT OF THE DISCLOSURE

This application discloses the novel compound 1,1-difluoro-2,2-dichloroethyl difluoromethyl ether having the formula $CHF_2OCF_2CHCl_2$. The compound is prepared by fluorination of the corresponding dichloromethyl ether using fluorinating agents in the presence of pentavalent antimony salts or tetravalent halides as fluorination catalysts. The precursor dichloromethyl ether is prepared by chlorination of the methyl ether. The novel ether has useful anesthetic properties and is a useful solvent.

CROSS-REFERENCE TO RELATED APPLICATION

This is a division of copending application Ser. No. 583,948 filed Oct. 3, 1966 now Pat. No. 3,461,213.

This invention relates to the new compound 1,1-difluoro-2,2-dichloroethyl difluoromethyl ether having the structural formula $CHF_2OCF_2CHCl_2$, and its method of preparation.

1,1-difluoro-2,2-dichloroethyl difluoromethyl ether is readily prepared by fluorinating the corresponding dichloromethyl ether in the presence of a suitable fluorination catalyst, according to the following reaction equation:

(1) 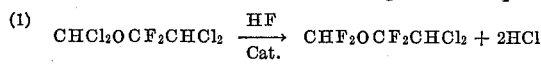

Fluorinating agents useful in carrying out the above reaction are hydrogen fluoride (HF) and antimony trifluoride ($SbF_3$). The fluorination catalysts used comprise pentavalent antimony salts such as $SbF_5$, $SbCl_5$, or tetravalent stannic halides such as $SnCl_4$. When $SbF_3$ is used as the fluorination agent the reaction proceeds advantageously at the boiling point of the product and the product is distilled from the reaction mixture as formed. When hydrogen fluoride is used as fluorination agent the reaction can be carried out at temperatures up to the boiling point of the reaction mixture. Lower temperatures are preferred, as the yields are higher. A temperature of 0°–10° C. is preferred.

The use of the above catalysts is required in order to carry out the fluorination effectively. In the absence of such catalysts the fluorinating agents are inoperative. Preferably the catalyst is used in an amount comprising from ½ to 10% by weight (calculated as $SbCl_5$) of the reaction mixture. Upon completion of the reaction the product is readily separated by distillation.

The precursor dichloromethyl ether employed in the preparation of the new difluoromethyl ether is a new compound. It may advantageously be prepared by chlorination of 1,1-difluoro-2,2-dichloroethyl methyl ether in accordance with the following reaction equation:

(2) 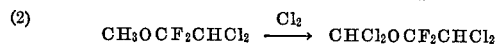

The chlorination advantageously is carried out at temperatures of 20°–40° C. with the addition of about 1.5 to 2.0 molar equivalents of chlorine. The reaction proceeds readily in the presence of incandescent light to yield the desired $CHCl_2OCF_2CHCl_2$ which is used in the subsequent fluorination. The following examples illustrate the preparation of the new compound:

EXAMPLE I

Preparation of the intermediate $CHCl_2OCF_2CHCl_2$

To a 3-necked round-bottomed flask fitted with a "Dry-Ice" condenser, a fritted glass gas inlet tube, a thermometer, and a stirrer, was charged 165 g. (1 mole) of $CH_3OCF_2CHFCl$. After flushing the system with nitrogen, chlorine gas was added via the inlet tube while the reaction was stirred and illuminated with a 300 watt incandescent lamp. The chlorination was rapid and exothermic and the reactor was cooled to hold the temperature between 30° and 35° C. The effluent gases were led from the top of the condenser to a water scrubber which was titrated at intervals with standard base. When a total of 1.94 moles of HCl per mole of ether was titrated the reaction was stopped. The crude product obtained weighed 224 g. which corresponded to the addition of 1.67 moles of chlorine per mole of the starting ether. The product was flash distilled to yield 215 g. of crude product. Fractional distillation of this mixture using a 60 x 1 cm. column packed with glass helices yielded 74 g. consisting essentially of $CHCl_2OCF_2CHCl_2$, B.P. 56°–59° C. at 20 mm., $n_D^{20}$ 1.4263–1.4283.

Analysis.—Calc. for $C_3H_2F_2Cl_4O$ (percent): C, 15.4; H, 0.86. Found (percent): C, 15.32; H, 0.82.

There was also recovered 25 g. of the monochlorinated product $CH_2ClOCF_2CHCl_2$ which can be recycled.

EXAMPLE II

Preparation of $CHF_2OCF_2CHCl_2$

To a mixture of 220 g. $CHCl_2OCF_2CHCl_2$ prepared as described in Example I, and 5.5 g. (2.5% by weight) $SbCl_5$ was added anhydrous hydrogen fluoride while the temperature was maintained at 0±5° C. The reaction was carried out in a 3-necked stainless steel flask fitted with a stainless steel stirrer, a thermocouple well and a copper "Dry-Ice" condenser. The amount of hydrogen fluoride added was measured by titration of the HCl given off. At the end of the reaction the mixture was poured into water and the organic layer (123 g., $n_D^{20}$ 1.3512) recovered. Fractional distillation gave 94 g. of the pure ether $CHF_2OCF_2CHCl_2$, B.P. 87° C., $n_D^{20}$ 1.3484.

Analysis.—Calc. (percent): C, 17.93; H, 0.99; F, 37.82. Found (percent): C, 18.08; H, 1.06; F, 37.95.

EXAMPLE III

To a stirred mixture of antimony trifluoride (50 g.) and antimony pentafluoride (1 g.) in a stainless steel flask was added a total of 74 g. of $CHCl_2OCF_2CHCl_2$. The ether was added slowly, keeping the reaction temperature at 80°–100° C. The product was distilled from the reaction mixture as it was formed. The total distillate was washed with cold 2 N base, dried over $K_2CO_3$, and distilled to give 27 g. of the desired $CHF_2OCF_2CHCl_2$.

1,1-difluoro-2,2-dichloroethyl difluoromethyl ether is a stable compound. It does not undergo degradation in the presence of alkali or light and has highly advantageous anesthetic properties. This compound is easily miscible with other organic liquids including fats and oils and has useful solvent properties, such as for example as a solvent for fluorinated olefins and other fluorinated materials, such for example as fluorowaxes. It may be used to prepare pastes and dispersions of such materials useful for coatings and the like and may be used as a degreasing agent.

1,1-difluoro-2,2-dichloroethyl difluoromethyl ether exhibits anesthetic properties in mammals and is extremely effective for inducing and maintaining anesthesia in laboratory animals, such as mice and dogs, when administered by inhalation. The agent is non-flammable in oxygen. It lends itself to effective use as an inhalant anesthetic in respirable mixtures containing life-supporting concentrations of oxygen. In addition, studies with the agent have shown that it is highly potent, affords good muscular relaxation, is non-toxic, produces minimal irritation and secretions, possesses a high margin of safety, affords rapid induction and recovery, and affords ease of control of levels of anesthesia.

Illustrative of the effectiveness of the agent are the tests conducted with mice in which separate groups of five mice were placed in 1 liter jars previously flushed with oxygen and charged with varying predetermined amounts of the agent. These tests showed the agent to be an effective anesthetic at concentrations as low as 1.25% by volume. The induction time at this concentration was 0.90 minute. At a higher concentration a reduction of induction time occurred, for example, at 2.5% induction occurred in approximately 0.45 minute. After 10 minutes exposure to such respirable atmospheres the test animals were withdrawn and recovered quite promptly, the recovery for example occurring in 2.5 minutes at the 1.25% concentration level and 5.7 minutes at the 2.5% anesthetic level.

The closed system with face mask were employed for administration of the agent in connection with dog anesthesia. Tests were carried out with dogs utilizing an average dose of 0.6–1.0 ml./kg./hr. during a series of ½ hour anesthesias. The mean induction time was 3.2 minutes and the recovery time 9.5 minutes.

It should be understood that the foregoing disclosure relates only to a preferred embodiment of the invention and that it is intended to cover all changes and modifications of the example of the invention herein chosen for the purpose of the disclosure which does not constitute departure from the spirit and scope of the invention.

I claim:
1. 1,1-difluoro-2,2-dichloroethyl difluoromethyl ether having the formula

$$CHF_2-O-CF_2CHCl_2$$

References Cited

UNITED STATES PATENTS

| 2,066,905 | 1/1937 | Booth. | |
| 2,803,665 | 8/1957 | Miller et al. | |
| 2,803,666 | 8/1957 | Miller et al. | |
| 3,095,354 | 6/1963 | Larsen et al. | 424—366 |
| 3,104,202 | 9/1963 | Larsen | 424—366 |
| 3,278,615 | 10/1966 | Larsen et al. | |

OTHER REFERENCES

Mitsch et al., Jour. Heterocyclic Chem., 1965, 2, pp. 152–155.

Gubanov et al., Zh. Obshck, Khim., 34 (8), pp. 2802–3, 1964.

Clayton et al., Jour. Chem. Soc., 1965, p. 7377.

Hudlicky, Chemistry of Organic Fluorine Compounds, MacMillan Co., New York, (1926), pp. 91–97.

LEON ZITVER, Primary Examiner

H. T. MARS, Assistant Examiner